April 6, 1965 G. MÄRKL 3,177,429
AMPLIFIER REGULATION CONTROL MEANS FOR A COMMUNICATIONS RELAY STATION
Filed Jan. 24, 1962
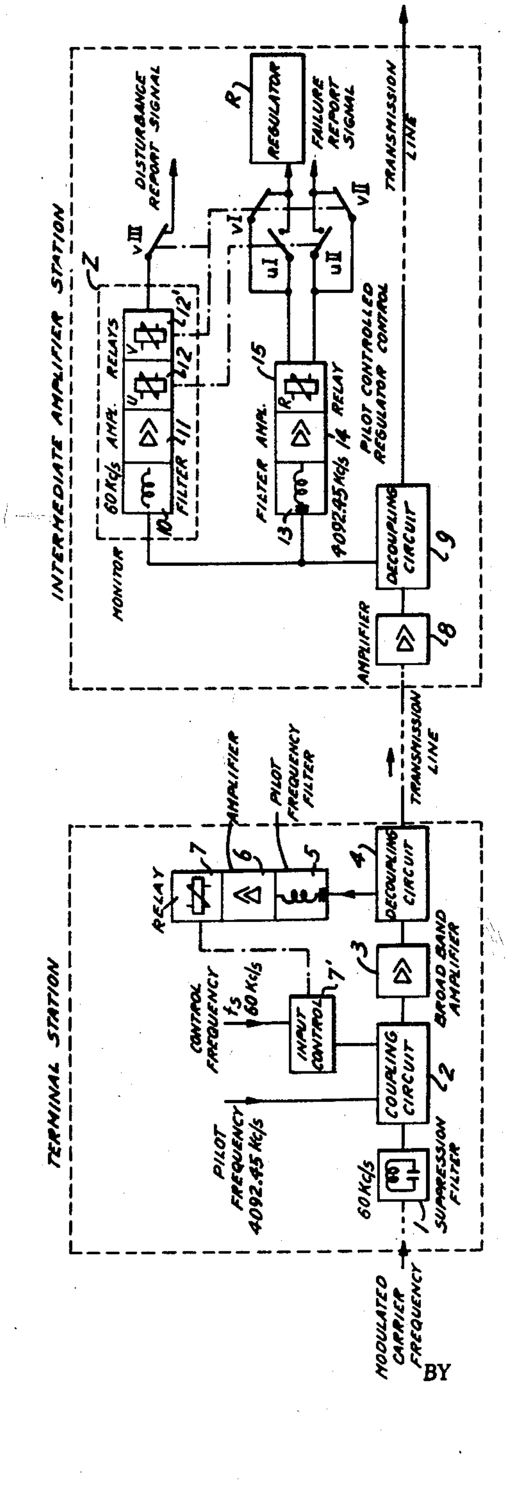
INVENTOR.
Georg Märkl
BY
Michael S. Striker
Attorney

United States Patent Office 3,177,429
Patented Apr. 6, 1965

3,177,429

AMPLIFIER REGULATION CONTROL MEANS FOR A COMMUNICATIONS RELAY STATION

Georg Märkl, Nurnberg, Germany, assignor to Felten & Guilleaume Fernmeldeanlagen G.m.b.H., Nurnberg, Germany Filed Jan. 24, 1962, Ser. No. 168,881
Claims priority, application Germany, Jan. 24, 1961, F 33,040
7 Claims. (Cl. 325—2)

The present invention concerns a control error preventing arrangement for carrier frequency operated transmission systems, and more particularly for systems having at least one pilot frequency controlled intermediate amplifier station. The control error preventing arrangement according to the invention is intended to prevent improper regulation of an intermediate amplifier station in the case of accidental variations of the pilot frequency transmission. The arrangement is particularly useful in television transmission through a carrier frequency transmission system.

As is well known for carrier frequency operated transmission systems, particularly for television transmission via coaxial cables, intermediate amplifier stations are arranged along cable lines of comparatively great length. These intermediate stations are usually not manned and require therefore automatic regulation. Conventionally such regulation devices are controlled by pilot signals introduced at the transmitter end of the cable connection at one or several selected pilot frequencies.

Particularly in the case of transmitting a television frequency band ranging e.g. between 556 and 6056 kc./s. via a carrier frequency transmission system it would be desirable to locate the pilot frequencies outside the video signal band. However, it has been found to be unavoidable to locate one of the pilot frequencies within the range of the television frequency band if an efficacious and sufficiently accurate regulation is to be achieved. According to CCITT (Comité Consultatif International Télégraphique et Téléphonique) the pilot frequency is to be located at 4092.45 kc./s. Theoretically this frequency is located in an interval between two multiples of the horizontal scanning frequency, i.e. in an area where practically no frequency components of the television frequency band may be expected to appear, however in view of the inaccuracy of the horizontal scanning frequency permitted by CCITT to amount to $1 \cdot 10^{-3}$ the above mentioned multiples of the horizontal scanning frequency may come very close to the pilot frequency or may even overlap the latter if the tolerance permitted by CCITT is exceeded which happens very frequently. However, if this is the case, then the above mentioned assumption that no frequency components of the television frequency band would affect the volume of the pilot frequency signal is not valid any more.

In order to prevent the volume of the pilot frequency signal from being affected at the receiving end by frequency components of the television frequency band i.e. in this case by interfering components, whereby improper regulation of the intermediate amplifier stations would be effected, conventionally a very narrow suppression filter has been arranged at the transmitter station ahead of the introduction of the pilot frequency. It was intended to create in this manner an interval free of signal frequencies and to introduce the pilot frequency into this interval.

Understandably this interval had to be kept very narrow so that as few components as possible of the television frequency band are suppressed or at least affected e.g. by phase and/or amplitude distortions or by transient phenomena.

As is well known the pilot frequency is filtered out from the television frequency band at the intermediate amplifier station also by a narrow filter, applied to a pilot frequency receiver or amplifier and utilized for controlling the regulation of the station. Consequently, this filter controlling the reception of the pilot frequency must be very narrow in order to prevent frequency components of the television frequency band from entering the pilot frequency receiver because such components would affect the volume of the pilot frequency signal. In order to prevent deviations of the volume of the pilot frequency signal at the receiver from exceeding a predetermined value, the sum of the attenuation of the suppression filter at the transmitter end of the attenuation of the filter at the pilot frequency receiver must not be lower than a value depending upon the above mentioned value i.e. the blocking range of the suppression filter and the spacing between the blocking ranges of the pilot frequency receiving filter must be equal to each other.

However it has been found that it is technically very difficult to make the spacing between the blocking areas of the pilot frequency receiving filter as narrow as the blocking range of the suppression filter, or to make the blocking range of the suppression filter as wide as the spacing between the blocking ranges of the pilot frequency receiving filter so that the total attenuation produced by both filters together is not less than a sufficient amount. Due to these difficulties encountered with the use of ordinary filters means the characteristic curve of the superimposed attenuations of the two filters displays areas of reduced effectiveness into which may enter frequency components of the television frequency band on account of the lack of accuracy of the horizontal scanning frequency.

However, even if one disregards the fact that it is difficult to provide for a pilot frequency receiving filter exactly matching the characteristics of the suppression filter and to maintain its attenuation within the passband constant in spite of temperature and aging effect, it is still uneconomical to provide for this purpose a highly expensive filter because in cable connections of great length great numbers of these filters would be required. On the other hand however it is also not advisable to use a multiple quartz filter for broadening the blocking range of the suppression filter and thus to match the suppression filter with a pilot frequency receiving filter of ordinary type. A thus broadened suppression filter would necessarily produce at the margins of its range very substantial phase shifts and thereby badly affect a substantial area of the television frequency band.

Thus the art is confronted with two demands opposed to each other, namely to use at the transmitter end a very narrow suppression filter in order to reduce as much as possible any detrimental influence on the television frequency band, and, on the other hand, to use as broad as possible a suppression filter matched with the regular pilot frequency receiving filter in order to prevent the control exerted by the pilot frequency signal at the receiving end as much as possible from being influenced by the television frequency band.

It is therefore among the objects of this invention to provide for an arrangement which overcomes the above described difficulties.

It is another object of this invention to provide for a control arrangement which avoids entirely the use of a suppression filter for the pilot frequency at the transmitter end of the system.

It is another object of this invention to provide for a control arrangement of the type set forth which is composed of a comparatively small number of entirely reliable parts and which is highly efficient and reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the invention is illustrated by way of example in the form of a block diagram.

The drawing shows a portion of a transmission system namely one terminal station, or more precisely the transmitting station, one intermediate amplifier station and portion of the transmission lines. The relay contacts shown in the drawing are in their position corresponding to non-energized condition of the respective relay coil. The television frequency band is introudced at the terminal station into a simple suppression filter 1 which eliminates from the input frequencies a predetermined frequency which is intended to be used as a control frequency e.g. the frequency of 60 kc./s. whereafter the remaining frequency band is applied to a conventional coupling circuit 2. At this point at least two auxiliary frequencies are applied to the thus formed frequency band, namely the desired pilot frequencies, (at least a pilot frequency of 4092.45 kc./s.) and a control frequency $f_s$ of e.g. 60 kc./s. However, the suppression filter 1 is only required if the Ny quist filter of the video signal transmitting equipment (not shown) does not sufficiently attenuate the frequency of 60 kc./s. Since a frequency of 60 kc./s. is very substantially spaced from the lowest frequency of 556 kc./s. of the television frequency band, a comparatively very simple suppression filter will give satisfactory results. The thus modulated carrier frequency is now applied through a broad band amplifier 3 to a decoupling circuit 4 with the desired transmission amplitude determined by the amplifier 3. Decoupling and coupling circuits, as mentioned above, for this or similar purposes are well known e.g. as described and illustrated in "Electrical Engineer's Handbook" published by John Wiley & Sons, Inc., New York 1950, pages 6–12. By means of the decoupling circuit 4 and the pilot frequency filter 5 the pilot frequency of 4092.45 kc./s. is filtered out and applied to the amplifier 6. This amplifier having a fixed amplification factor serves to check on the actual amplitude of the pilot frequency signal since its output is applied to an electromagnetic or electronic relay 7 which does not respond when the pilot frequency signal has the desired and predetermined amplitude. If however this amplitude or volume of the pilot frequency signal is changed or affected by frequency components of the television frequency band, then the relay responds and actuates an input control 7' arranged between the input of the control frequency $f_s$ and the coupling circuit 2. Ordinarily the input control 7' may be simply a normally closed switch. In this case the response of the relay 7 will result in opening this switch and disconnecting the input of the control frequency $f_s$.

Each intermediate amplifier station has usually an amplifier 8 and a decoupling circuit 9 connected in the general transmission line as shown and a conventional regulator device R controlled by pilot frequency signals applied from the conventional decoupling circuit 9 through a filter 13 passing the pilot frequency of 4092.45 kc./s., an amplifier 14 and a relay 15. However, according to the invention at least one normally open relay contact *u*I is arranged between the relay 15 and the regulator R. The relay contact *u*I, as well as the contact *u*II explained further below, is controlled by a monitoring arrangement Z which is also connected with the decoupling circuit 9 and comprises a filter 10 passing the control frequency $f_s$ of 60 kc./s., an amplifier 11 amplifying the control frequency signal and applying it first, of all to a relay 12 which closes, when energized, the contacts *u*I and *u*II. Consequently, the regulator device R can be controlled in the normal manner by the pilot frequency as long as the control frequency energizes the relay 12 and closes its relay contact *u*I. However, if, as mentioned above, in the case of an undesired variation of the amplitude or volume of the pilot frequency the control frequency is disconnected from the system as mentioned above, the relay 12 is de-energized and the contact *u*I opens whereby the regulation of the intermediate amplifier station or stations by an adulterated pilot frequency signal is made impossible. For the sake of simplicity the just mentioned control error preventing arrangement is illustrated by an electro-mechanical relay 12 with contact *u*I but evidently electronic means of equivalent function could be used as well.

It will be understood that the drawing is likewise illustrative of an arrangement in which the switching on and off of the control frequency $f_s$ is carried out in an opposite sense, namely in such a manner that the control frequency $f_s$ is normally not transmitted, but is transmitted only when the volume or amplitude of the pilot frequency signal deviates from the desired and predetermined value. The only difference in this case would be that the input control 7' normally blocks the introduction of the control frequency $f_s$ into the coupling circuit 2 and is unblocked by the response of the relay 7 e.g. by closing a normally open relay contact. Likewise, the relay contacts *u*I and *u*II would be normally closed and would be opened by the energization of the relay 12.

A refinement of the invention consists in the establishment of an operational relation between the amplifiers 6 and 14 in such a manner that the amplifier 6 is sensitive to very minute variations of the amplitude or volume of the pilot frequency signal and has a shorter time constant than the receiver amplifier 14. This has the effect that the control frequency $f_s$ is disconnected (or connected as the case may be) already before the amplifier 14 could respond to a pilot frequency signal of an amplitude of undesired value and thus could cause an improper regulation of the respective intermediate amplifier station.

It is customary to provide for a failure report signal in the case of a failure of the regulatory arrangement or in the case of a breakdown of the pilot frequency signal. In order to avoid that in the arrangement according to the invention a failure report signal is given misleadingly or wrongly when only the regulator arrangement is rendered inoperative as described above, a second normally open relay contact *u*II, controlled also by the relay 12 is arranged in the line normally used for giving the failure report signal. Consequently, when the regulator arrangement R is disconnected by the contact *u*I also the failure report signal line is disconnected by the contact *u*II.

It has to be taken into consideration that there is a possibility that either a failure of the control frequency input in the terminal station or a breakdown of the monitoring arrangement Z in an intermediate amplifier station may occur. If this is the case then the regulator arrangement at least of the particular intermediate amplifier station would be permanently taken out of action. In this case a disturbance report signal is necessary.

However, it is not possible to use the lack of output energy at the amplifier 11 as a criterion for giving a disturbance report signal, because in the case of normal operation of the arrangement according to the invention the amplifier 11 would not deliver energy also when the control frequency signal is stopped by the input control 7' upon a deviation of the pilot frequency signal from the desired normal amplitude thereof.

Therefore the invention provides for a modification which permits giving a disturbance report signal when for instance the control frequency fails or the amplifier 11 breaks down. For this purpose the arrangement is such that the response of the relay 7 to a deviation of the pilot frequency signal amplitude from the desired value does not cause the input control 7' to disconnect the input of the control frequency $f_s$ but modifies the level of this control frequency signal by raising or lowering its amplitude a certain amount by conventional means. In this case the relay 12 is so constructed that contacts *u*I and *u*II are opened by any such raising or lowering of the amplitude of the control frequency signal. However a second relay 12' also connected for energization with the amplifier 11 is provided which keeps a normally closed contact *v*III in open position as long as a control frequency signal of any amplitude is delivered by the amplifier 11. Only if the control frequency signal entirely disappears at the output of the amplifier 11 the contact *v*III is closed and thereby closes a circuit causing the delivery of a disturbance report signal. Consequently the delivery of such a disturbance report signal is independent of the regular operation of the arrangement according to the invention.

Preferably two further normally closed relay contacts *v*I and *v*II are arranged in parallel with the above mentioned contacts *u*I and *u*II, as shown, and operated by the relay 12' so that in the above described case, that is in the case of a failure of the monitoring arrangement Z the relay 12' is de-energized and via its consequently now closed contacts *u*I and *u*II also the regular operation of the regulator arrangement R and the transmission of the failure report signal is reinstated.

It can be seen from the above that by the invention any improper regulation of an intermediate amplifier station is safely prevented although in the transmitting terminal station no selective means are provided or required for suppressing frequency components of the television frequency band in the neighborhood of the pilot frequency of 4092.45 kc./s., which means, as stated further above, may undesirably affect the television frequency band.

However, if the volume or amplitude of the pilot frequency signal deviates from its assigned value due to causes appearing along the transmission line or in any one of the components of the transmission system, the function of the regulator devices in the intermediate amplifier station or stations is not affected by the arrangement according to the invention, except when the reason for a deviation of the pilot frequency signal volume is caused by frequency components of the television frequency band. Since the above mentioned modifications of the transmission condition occur during time periods which are much longer than the time periods during which the control frequency is disconnected, the resulting interruption of the regulation procedure in the intermediate amplifier station or stations cannot affect their final adjustment, but will only slightly delay the latter.

It will be understood that a further advantage of the arrangement according to the invention consists in the fact that the pilot frequency receiving filter 13 in the intermediate amplifier station or stations may have a broader passing range than was possible up to now so that e.g. expensive quartz filters need not be used. The use of broader filters has only the effect that the regulator arrangement or arrangements are rendered inoperative more frequently than in the case of the use of narrow filters, without however affecting the final adjustment of the regulator.

It will be understood that each of the elements described above, or two or more together, may also find a useful application in other types of a control arrangement for preventing improper regulation of an intermediate amplifier station in a transmission system differing from the types described above.

While the invention has been illustrated and described as embodied in a control arrangement for carrier frequency transmission systems, particularly for television transmission, for preventing improper regulation of an intermediate amplifier station in such system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station; means for introducing into said transmission system a control signal at a frequency located outside said frequency band; means responding to a volume deviation of said pilot frequency signal by causing a predetermined modification of said control signal; and monitoring means in said intermediate amplifier station responding to said predetermined modification of said control signal by rendering said regulator means inoperative as long as said modification of said said control signal prevails, whereby an improper regulation of said intermediate amplifier station due to an unintended volume deviation of said pilot frequency signal is prevented.

2. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station; means for continuously introducing into said transmission system a control signal at a frequency located outside said frequency band; means responding to a volume deviation of said pilot frequency signal by interrupting said control signal; and monitoring means in said intermediate amplifier station responding to an interruption of said control signal by rendering said regulator means inoperative as long as said interruption of said control signal prevails, whereby an improper regulation of said intermediate amplifier station due to an unintended volume deviation of said pilot frequency signal is prevented.

3. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station; means for furnishing a control signal at a frequency located outside said frequency band; means responding to a volume deviation of said pilot frequency signal by causing introduction into said transmission system of said control signal; and monitoring means in said intermediate amplifier station responding to the introduction of said control signal by rendering said regulator means inoperative as long as said introduction of said control signal prevails, whereby an improper regulation of said intermediate amplifier station due to an unintended volume deviation of said pilot frequency signal is prevented.

4. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station, but reacting to variation of the volume of said pilot frequency signal with a predetermined first time constant; means for introducing into said transmission system a control signal at a frequency located outside said frequency band; means responding with a predetermined second time constant shorter than said first time constant to a predetermined minimum value of a volume deviation of said pilot frequency signal by causing a predetermined modification of said control signal; and monitoring means in said intermediate amplifier station responding to said predetermined modification of said control signal by rendering said regulator means inoperative as long as said modification of said control signal prevails, whereby an improper regulation of said intermediate amplifier station due to an unintended volume deviation of said pilot frequency signal is prevented.

5. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station, and alarm means for giving a failure report signal in the case of failure of said regulator means or of said pilot frequency signal; means for introducing into said transmission system a control signal at a frequency located outside said frequency band; means responding to a volume deviation of said pilot frequency signal by causing a predetermined modification of said control signal; and monitoring means in said intermediate amplifier station responding to said predetermined modification of said control signal by rendering said regulator means and said alarm means inoperative as long as said modification of said control signal prevails, whereby an improper regulation of said intermediate amplifier station due to an unintended volume deviation of said pilot frequency signal is prevented.

6. A control error preventing arrangement for carrier frequency transmission systems, particularly for television transmission, for preventing improper regulation of an intermediate amplifier station in said system, comprising, in combination, a carrier frequency operated transmission system for transmitting a frequency band, and at least one pilot frequency signal of predetermined volume; at least one intermediate amplifier station arranged in said transmission system for receiving and transmitting said frequency band including said pilot frequency signal, and including regulator means responding to said pilot frequency signal by regulating the operation of said intermediate amplifier station, but reacting to variation of the volume of said pilot frequency signal with a predetermined first time constant, and first alarm means for giving a failure report signal in the case of failure of said regulator means or of said pilot frequency signal; means for introducing into said transmission system a control signal at a frequency located outside said frequency band and at a predetermined volume; means responding with a predetermined second time constant shorter than said first time constant to a predetermined minimum value of a volume deviation of said pilot frequency signal by causing a partial variation of said predetermined volume of said control signal; and monitoring means in said intermediate amplifier station responding to said partial variation of said predetermined volume of said control signal by rendering said regulator means and said alarm means inoperative as long as said partial variation of said predetermined volume of said control signal prevails, while returning said regulator means to operativeness when said control signal returns to said predetermined volume, and including second alarm means for giving a disturbance report signal in the case of a failure of said control signal or of a breakdown of said monitoring means, whereby an improper regulation of said intermediate amplifier station due to an unintended volume deviation of said pilot frequency signal is prevented.

7. An arrangement as claimed in claim 6, wherein said monitoring means further include means for returning said regulator means and said first alarm means to operativeness also when no control signal is available at said monitoring means.

References Cited by the Examiner

UNITED STATES PATENTS 2,626,993 1/53 Wright et al. ........... 333—16

FOREIGN PATENTS 579,144 7/46 Great Britain.

DAVID G. REDINBAUGH, *Primary Examiner.*